Nov. 5, 1968   J. BEMROSE ET AL   3,409,905
EYELID GALVANOMETER
Filed March 31, 1966   3 Sheets-Sheet 2
FIG.2
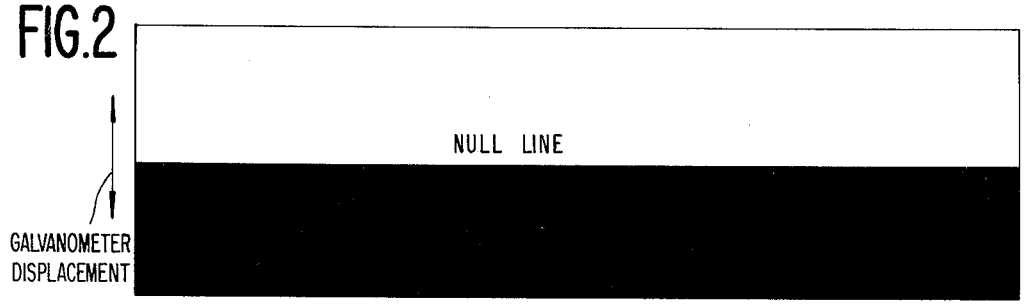
FIG.3a
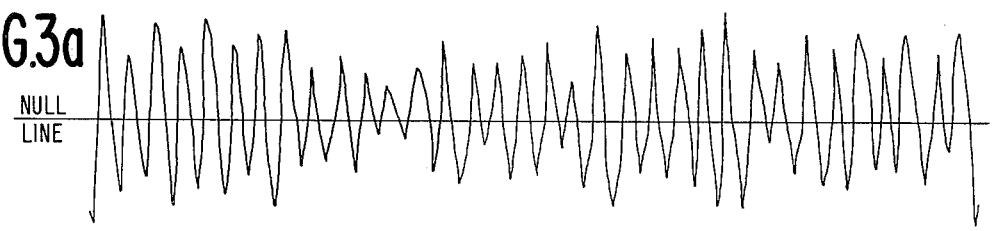
FIG.3b
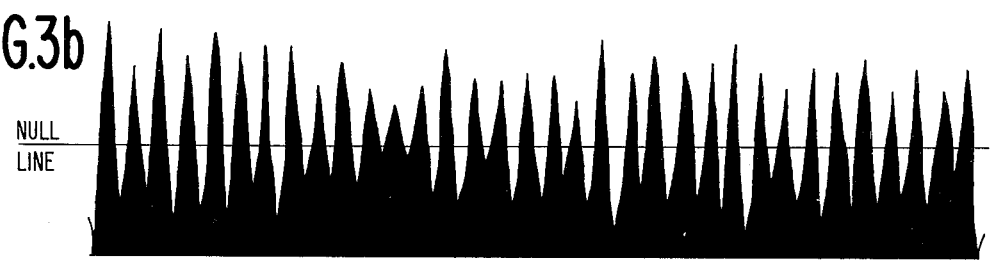
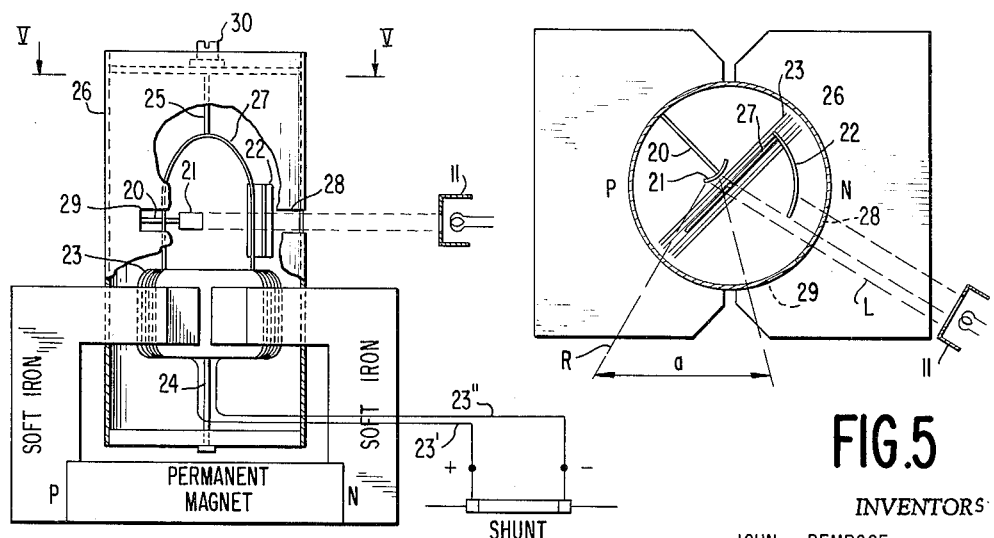
FIG.4   FIG.5
INVENTORS
JOHN BEMROSE
LAUREN G. KILMER
BY McLean, Morton & Boustead
ATTORNEYS

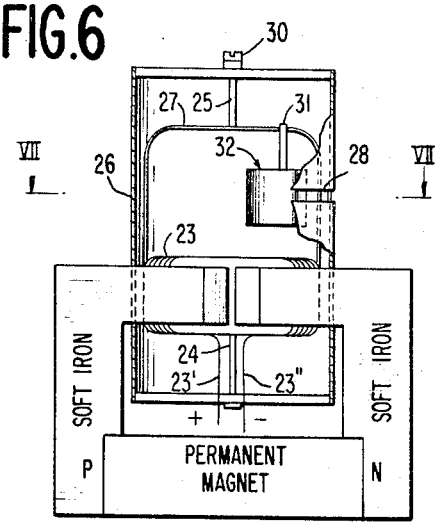
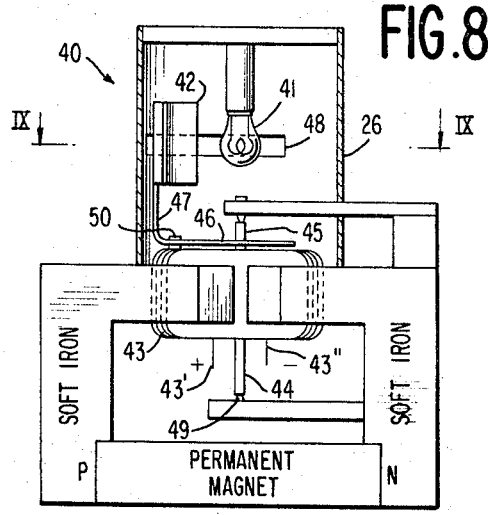
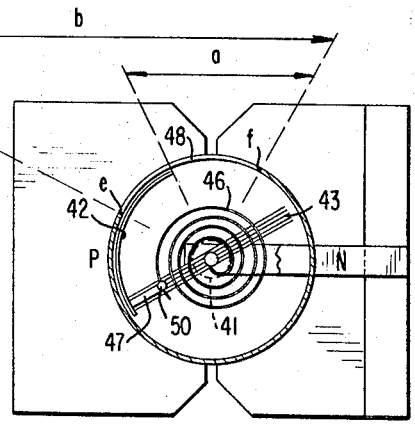
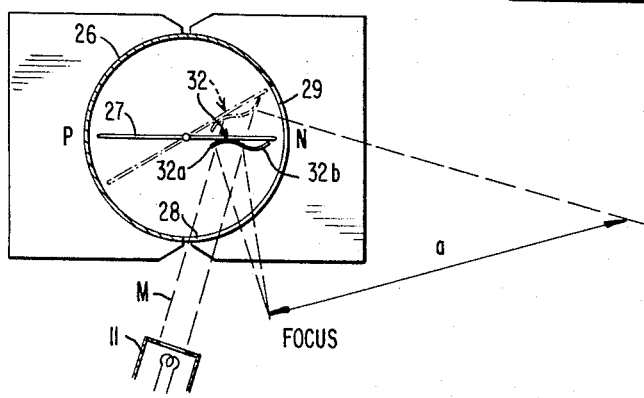
INVENTORS
JOHN BEMROSE
LAUREN G. KILMER

United States Patent Office 3,409,905
Patented Nov. 5, 1968

3,409,905
EYELID GALVANOMETER
John Bemrose and Lauren G. Kilmer, Tulsa, Okla., assignors to Sinclair Research, Inc., New York, N.Y., a corporation of Delaware
Filed Mar. 31, 1966, Ser. No. 539,093
5 Claims. (Cl. 346—109)

ABSTRACT OF THE DISCLOSURE

Apparatus for making a variable area photographic record of electrical transients. The electrical signal is applied to a galvanometer to rotate a light shield. Light modulated by the light shield passes out of the galvanometer housing and is applied to a photosensitive medium so that the exposed area of the photosensitive medium is indicative of the electrical signal strength. In one embodiment the light passes into the housing and is reflected by a fixed mirror with the shield comprising a shutter to block a portion of the light inlet or the outlet. In another embodiment the light beam passes into the housing and the light shield comprises a mirror having a concave portion and a convex portion of varying radius to disperse the beam a variable width in accordance with the electrical signal strength. In a third embodiment the light originates within the housing, and the light shield comprises a shutter partially blocking the light outlet.

---

The present invention is concerned with a novel method and apparatus for recording in the form of variable area photographic records the electrical transients fed to a reflecting mirror type of galvanometer, and more particularly to the production of a seismic trace which is adapted for integration.

The general method of seismic exploration wherein a seismic disturbance, e.g. detonation of an explosive charge, dropping of a weight, etc., is initiated at a selected point in or on the earth and reflected or refracted seismic waves are detected at a plurality of points spread out in a desired pattern has long been known. Briefly the method consists in picking up the detected waves with sensitive detectors, known as geophones, which translate the detected energy into electrical impulses or transients. The latter are suitably amplified and recorded on a seismograph. The conventional seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, amplified, and fed to the galvanometers. The strip of paper or film is moved longitudinally at a substantially constant speed and is provided by well known means with timing marks so that when the seismograph record or seismogram is later examined it is possible to determine the length of time required for the arrival of seismic waves at any particular point on the earth's surface, either directly from the source or by reflection or refraction from underlying strata. From other data obtained in the area being studied, such as seismic wave velocities in the various earth layers, it is then possible to estimate the depths of the various reflecting substrata.

Oscillograph records of detected seismic waves obtained as just described when made in favorable areas may often be examined visually to pick out prominent reflections which will show up as similar transients on the adjacent traces on the record. However, in many instances such reflections are difficult to distinguish because of the complexity of the wave forms. It has more recently been noted that if the detected impulses are recorded in the form of variable area photographic records many more reflections can often be noted.

The present invention is directed to an apparatus and method which enables one to produce a seismic trace with a galvanometer camera wherein the portion of the photographic recording film to the right of the normal galvanometer trace is exposed to a continuous beam of light and the portion of the film to the left is unexposed to obtain a trace which may be integrated. The purpose of such record is to give an envelope of the seismic trace wherein the areas above and below, or to the right and left of the trace are either all light or all dark. Such records are readily amenable to integration of areas under the curve.

In general, the apparatus of the present invention uses a camera in which a beam of light is focused upon a fixed mirror and reflected to expose a continuously moving film. The width of the reflected beam of light is controlled by a shutter which is supported on the moving coil of the galvanometer and moves with the coil. The application of electrical signals to the galvanometer causes the coil to rotate which in turn moves the shutter to vary the width of the reflected light beam and correspondingly the amount of film exposed. If desired, the mirror may be omitted and the width of a beam emanating from a light source controlled directly by the shutter. A further modification of the present invention contemplates omission of the shutter and use of a mirror of complex shape having a small section of concave shape followed immediately by a section of convex shape which has a continuously changing curvature or one where the radius of curvature is continuously shorter as the curve moves away from the concave portion. This mirror receives a light beam and focuses it into a fine line of width depending upon the radius of curvature. This mirror is mounted on the moving coil so that the radius of curvature is proportional to the amplitude of the electrical signal.

The nature and objects of the invention will be more fully understood when reference is made to the accompanying drawings in which:

FIGURE 2 is a record for a no-signal position of the galvanometer;

FIGURE 3a is a record of a varying signal as conventionally recorded;

FIGURE 3b is a record of the varying signal of FIGURE 3a as recorded in accordance with the present invention;

FIGURE 4 is an elevation of a preferred embodiment of the present invention;

FIGURE 5 is a horizontal section of the preferred embodiment taken along line V—V of FIGURE 4;

FIGURE 6 is an elevation of a modified embodiment;

FIGURE 7 is a horizontal section of the modified embodiment of FIGURE 6 taken along line VII—VII of FIGURE 6;

FIGURE 8 is an elevation of yet another modified embodiment; and

FIGURE 9 is a horizontal section of the embodiment of FIGURE 8 taken along line IX—IX of FIGURE 8.

Figure 1:
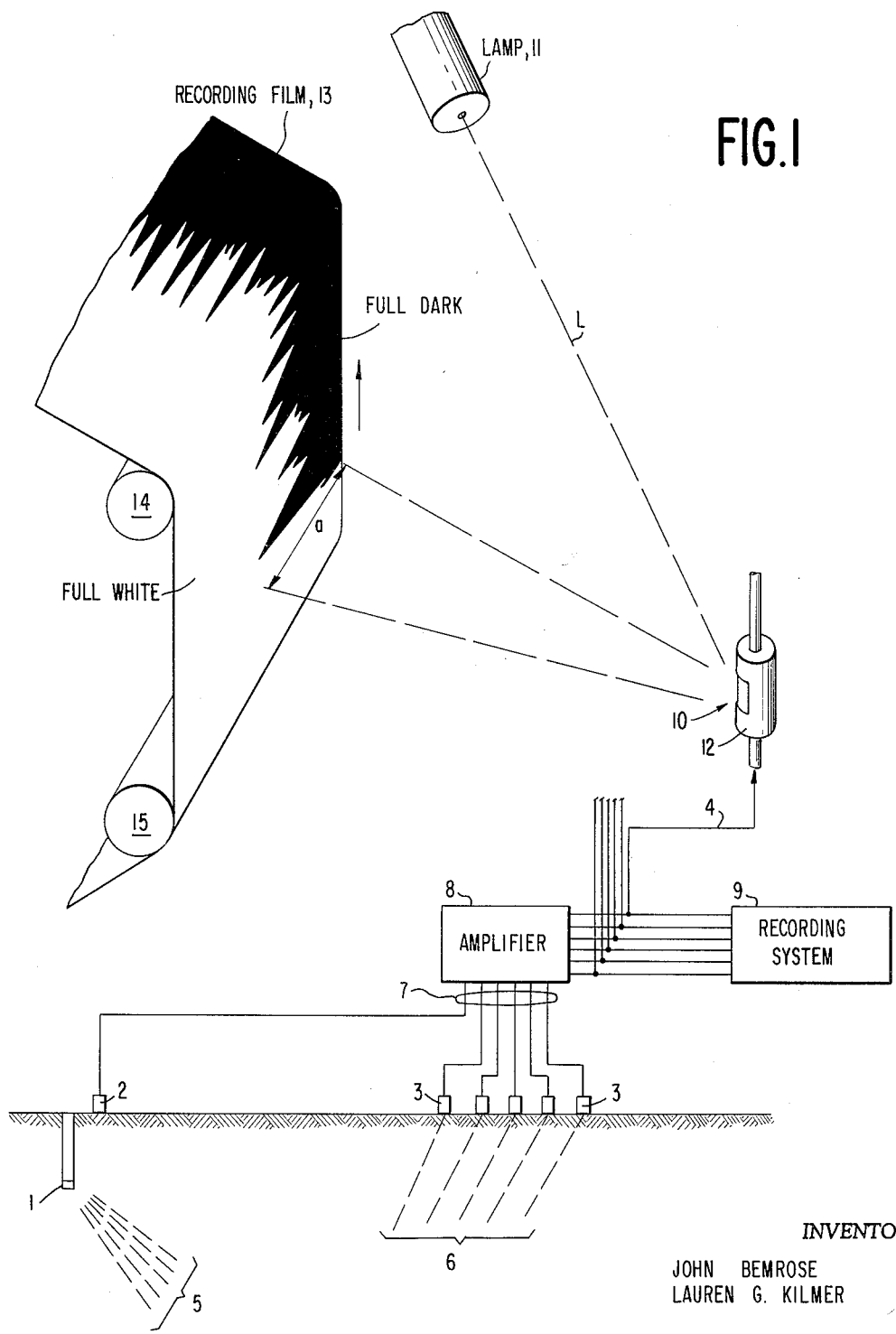
FIGURE 1 is a diagram of a seismic exploring system including a schematic showing of an arrangement in accordance with the present invention.

Referring now to FIGURE 1, the seismic exploring system includes an explosive charge 1 positioned in a bore hole to be detonated upon actuation of a blaster 2. Seismic reflection energy, which may for the present purpose be considered as following the paths of rays 5 and 6 as they course to and from a sub-surface reflecting interface, actuates a plurality of detectors 3 at the earth's surface which are connected by means of cable 7 to an amplifying system 8. The output of the amplifying system 8 may be applied to a recording system 9 for producing a reproducible record.

In order that the amplified electrical signals which appear at the output side of amplifying system 8 can be converted to curves on a record which can be visually inspected, there is provided for each output signal a recording camera, generally indicated at 10, only one camera being shown. Briefly, camera 10 comprises a movable strip of sensitized paper, generally indicated at 13, which is movable from a suitable supply spool not shown across rollers 14 and 15. A suitable tape or strip driving motor connected to one of the rollers causes the paper to move in the direction of the arrow and to be moved through the light beam. Preferably the sensitized paper or strip 13 is of the type which has a record produced thereon when subjected to a beam of light and subsequently developed in the same manner as a camera film although the instant- or self-developing type can be used. For the purpose of illustrating the present invention, a trace of the visual inspection type is illustrated as being produced on the sensitized strip 13. In practice, however, these curves or traces would not be visible in the manner indicated in FIGURE 1 of the drawing until after the film has been developed. In producing seismograms it is customary to include a time record thereon in the form of lines which extend across the face of the seismogram and which are spaced from each other by intervals of time such as one-tenth or one-hundredth of a second. A time record appears on the record or film 13 in the form of a variable area trace.

To provide a variable area record that may be visually evaluated or integrated in accordance with the present invention, electrical signals representative of the outputs of the amplifier 8 are impressed on galvanometer 10 and a secondary record is produced by way of a signal channel 4 which, in FIGURE 1, has been illustrated for one channel. The electrical current for the transient, i.e. electrical representation of a detected seismic wave, passed through channel 4, as more fully described hereinafter, is impressed on galvanometer 10 to control the position of shutter 12. Shutter 12 rotates in proportion to the strength of the current to vary the width of light beam L emitted from light source 11 and reflected by galvanometer 10 to provide a trace on film 13.

Referring to FIGURES 4 and 5, a preferred arrangement of the galvanometer 10 is shown which includes a permanent magnet and soft iron pieces. A moving coil 23 is supported in a barrel or container 26 for movement in the magnetic field of the permanent magnet by bottom ligature 24 and top ligature 25 through wire loop 27. The movement of coil 23 in the magnetic field is proportional to the electrical current passed through coil 23 by leads 23′ and 23″, which is in turn proportional to the reflected signals of the seismic waves generated. Screen 22, which is attached to the wire loop 27, as shown, or in any other position which allows the screen to move freely with the moving coil 23, forms shutter 12 of FIGURE 1. Screen 22 is of sufficient size to fully cover notch opening 28 in barrel 26 which allows light beam L to pass into the interior of barrel 26 and be reflected by mirror 21 which has a curvature such that light beam L will be diverged to a width a to cover the film 13 at the normal distance. Mirror 21 is supported on fixed post 20 in barrel 26. Notch opening 29 allows the reflected light R to pass from mirror 21 to the film 13. If desired, screen 22 could be arranged to extend over notch opening 29. A zero adjustment device 30 allows alignment of the moving coil 23 and shutter 22 with respect to the notches 28 and 29 and light source 11.

Screen 22 normally extends over part of the light beam L passing to mirror 21 so that, with the galvanometer coil 23 in the null position, light will be reflected from only about half the available area of the mirror 21, the other half being occluded to constantly expose a substantial portion of the film. The photographic recording on film 13 for this null, or no-signal, position of the galvanometer 10 would, for example, have one-half white and the other half black as illustrated in FIGURE 2.

Screen 22 is free to rotate around the post 20 with coil 23 as driven by the signal current. A positive signal applied to the galvanometer 10 will, for example, cause the screen 22 to rotate so that more white and less dark areas are exposed; and conversely, the application of a negative signal to the galvanometer 10 will rotate the screen 22 in the opposite direction exposing, respectively, less white and more dark areas and the displacement, and therefore the amount of dark or white areas exposed, is proportional to the signal strength. For a transient of the detected energy, i.e. a varying signal of positive and negative excursions varying with time, which is conventionally recorded as shown in FIGURE 3A, the corresponding variable area recording resembles that shown in FIGURE 3B, the trace being all white on one side and all black on the other. The present system permits the full intensity of light at the source 11 to be utilized for dispersal by the mirror; and this, combined with the complete occlusion of light by the shutter 22 in its varying positions, will produce a variable area trace of great optical contrast, thus permitting accurate optical integration or other processing desired subsequently.

Referring to FIGURES 6 and 7, a modification of the present invention is provided in which the galvanometer light source 11 is a collimated light beam M of narrow width or diameter. Upon the galvanometer coil 23 is placed a mirror 32 of complex shape, see FIGURE 6, including a small section 32a of concave focusing mirror followed immediately by a mirror section 32b of convex shape which has a continuously changing curvature or one where the radius of curvature is continuously shorter as the curve moves away from the concave portion 32a. The function of mirror 32 is to receive the collimated beam of light M and focus it to a fine line of width a. The concave mirror 32a receives the pencil of light M and disperses it into a fan shape of varying widths a depending upon the radius of curvature. The placement of curves upon the mirrors is such that dispersed light from no portion of convex mirror will pass over the point of focused light from the concave mirror. The mirror 32 is secured to the moving coil 23 through a retainer 31 which is attached to the wire loop 27 in turn attached to coil 23. As coil rotates under the influence of a signal, as described above, it sweeps a fan of light of dispersion a across the film 13 through notch 29 which dispersion is directly proportional to the signal strength, with the right portion of the film exposed to light and the portion left of the delineator line unexposed.

FIGURES 8 and 9 illustrate another modification of the present invention wherein parts similar to the embodiments of FIGURES 4 and 5 are identified by like reference numerals. According to this embodiment, lamp house 11 and galvanometer mirror 21 of FIGURE 4 are replaced by a mechanism constructed thusly:

A small single-point light source 41 is arranged at a normal position of the galvanometer 40. The light from source 41 shines directly upon the film 13 and disperses in all directions. Over and surrounding the source 41 on the axis or center line of the lamp is a rotary shutter 42 which is mounted on the shaft 45 of the pivoted moving coil 43 for the galvanometer which includes a bottom pivot shaft 44 and a top pivot shaft 45 for moving coil 43. The shutter 42 is supported on a flat, compression spring 46 attached to shaft 45 at its inner end and to the moving coil 43 by arm 47. Spring 46 is also attached to coil 43 by retainer 50. Bearings 48 and 49 support shafts 44 and 45. The shutter 42 has a portion cut away such that as it rotates with moving coil 43 according to the energy supplied at leads 43′ and 43″, it allows the light to exit through notch 48 defined by limits e and f, and expose film 13 with a maximum image of width b. The operation of the shutter 42 is similar in every way to the shutter operation of the device illustrated in FIGURE 4 and provides a light beam of varying width a for recording on film 13. The result is a seismic one-trace record wherein all areas of film to the right of the shadow line will be exposed and all areas to the left will be unexposed.

It is claimed:

1. An apparatus for making a variable area photographic record of an electrical transient which comprises in combination a source of light; galvanometer means including a moving coil rotatably mounted in a magnetic field, first means for supplying electric current representative of said transient to said coil, said coil rotating a distance proportional to variations in said transient when said current is applied thereto, and second means including a mirror supported on said coil to rotate therewith and having a complex shape including a concave section adjacent a convex section of continuously changing curvature, said concave section adapted to receive light from said source and to disperse the received light in a fan shape of varying with depending upon the curvature; a photosensitive medium positioned such that the dispersed light impinges upon said medium, a substantial portion of the width of said medium being exposed to said dispersed light when said second means is in a null position with no current supplied to said coil; and means for moving said medium relative to said dispersed light.

2. An apparatus for making a variable area photographic record of an electrical transient produced by a geophone which comprises in combination a housing having an opening; a source of light; galvanometer means within said housing and including a moving coil mounted in a magnetic field, first means for supplying electric current representative of said transient to said coil, said coil rotating a distance proportional to variations in said transient when said current is applied thereto, and second means including a mirror of complex shape supported on said coil and rotating therewith and having a concave section adjacent a convex section of continuously changing curvature, said concave section adapted to receive light from said source and to disperse received light through said opening in a fan shape of varying width depending upon the curvature; a photosensitive medium positioned outside said housing such that the dispersed light impinges upon said medium, a substantial portion of the width of said medium being exposed to said dispersed light when said second means is in a null position with no current supplied to said coil; and means for moving said medium relative to said dispersed light.

3. The apparatus of claim 2 wherein said curvature has a continually shorter radius of curvature.

4. The apparatus of claim 3 wherein said sections of the mirror are arranged so that dispersed light from no portion of the convex section will pass over the point of focused light from said concave section.

5. The apparatus of claim 2 wherein said film is approximately half-expressed in said null position of said second means.

References Cited

UNITED STATES PATENTS

| | | | |
|---|---|---|---|
| 1,713,226 | 2/1929 | Hall | 346—109 |
| 1,740,130 | 12/1929 | Von Voss et al. | 116—114 |
| 2,036,447 | 4/1936 | Tuttle et al. | 350—269 X |
| 2,137,267 | 11/1938 | Cawley | 350—285 X |
| 2,286,820 | 6/1942 | Lenehan. | |
| 2,493,534 | 1/1950 | Hawkins | 346—33 X |
| 3,278,941 | 10/1966 | Cheney | 346—109 |

RICHARD B. WILKINSON, *Primary Examiner.*

JOSEPH W. HARTARY, *Assistant Examiner.*